United States Patent
Hart et al.

(10) Patent No.: US 11,722,981 B2
(45) Date of Patent: Aug. 8, 2023

(54) RE-ESTIMATING CLOCK OFFSET FOR FREQUENCY-SELECTIVE WIRELESS CHANNELS

(71) Applicant: Cisco Technology, Inc., San Jose, CA (US)

(72) Inventors: Brian D. Hart, Sunnyvale, CA (US); Ardalan Alizadeh, Milpitas, CA (US); Daniel J. Lyons, Medina, OH (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 17/444,008

(22) Filed: Jul. 29, 2021

(65) Prior Publication Data
US 2023/0034115 A1    Feb. 2, 2023

(51) Int. Cl.
*H04W 56/00*    (2009.01)
*H04L 27/26*    (2006.01)

(52) U.S. Cl.
CPC ..... *H04W 56/0095* (2013.01); *H04L 27/2657* (2013.01)

(58) Field of Classification Search
CPC .................. H04W 56/095; H04L 27/2657
USPC ......................................................... 370/329
See application file for complete search history.

(56) References Cited

U.S. PATENT DOCUMENTS

| | | | | |
|---|---|---|---|---|
| 8,804,804 B1* | 8/2014 | Sarris | ................. | H04L 27/2695 375/330 |
| 9,935,794 B1 | 4/2018 | Cao et al. | | |
| 2010/0080114 A1* | 4/2010 | Ratnam | ................. | H04L 5/0094 370/329 |
| 2011/0164671 A1 | 7/2011 | Matsumura | | |
| 2014/0169508 A1* | 6/2014 | Wei | ..................... | H04L 27/2657 375/343 |
| 2014/0294128 A1* | 10/2014 | Umeda | ............... | H04L 27/2675 375/346 |
| 2015/0117575 A1 | 4/2015 | Ganesan et al. | | |
| 2016/0142227 A1 | 5/2016 | Li et al. | | |
| 2017/0033966 A1* | 2/2017 | Al-Dweik | ......... | H04L 25/03178 |
| 2017/0054583 A1* | 2/2017 | Pratt | .................. | H04L 25/0204 |
| 2017/0163452 A1* | 6/2017 | Breiling | ............. | H04L 25/0204 |

(Continued)

FOREIGN PATENT DOCUMENTS

WO    2015099804 A1    7/2015

OTHER PUBLICATIONS

"IEEE P802.11be™/D1.0—Draft Standard for Information technology—Tele-communiations and information exchange between systems Local and metropolitan area networks—Specific Requirements," LAN/MAN Standards Committee of the IEEE Computer Society, Dated May 2021, pp. 1-635.

(Continued)

*Primary Examiner* — Robert J Lopata
(74) *Attorney, Agent, or Firm* — Patterson + Sheridan, LLP

(57) ABSTRACT

Aspects discussed herein include a method and associated network device and computer program product. The method includes receiving a network packet, and estimating, using a preamble of the network packet, a power distribution corresponding to a plurality of subcarriers of a channel. The method further includes estimating a carrier frequency offset using the power distribution, and estimating a clock offset using the carrier frequency offset.

20 Claims, 4 Drawing Sheets

(56) References Cited

U.S. PATENT DOCUMENTS

| | | | | |
|---|---|---|---|---|
| 2017/0187443 | A1* | 6/2017 | Chen | H04B 7/0667 |
| 2018/0076991 | A1* | 3/2018 | Lee | H04N 21/00 |
| 2019/0273646 | A1* | 9/2019 | Liao | H04L 27/2659 |
| 2020/0182959 | A1* | 6/2020 | Markhovsky | G01S 5/12 |
| 2020/0412472 | A1* | 12/2020 | Giannakis | H04L 27/2613 |
| 2021/0036744 | A1 | 2/2021 | Balakrishnan et al. | |
| 2022/0158870 | A1* | 5/2022 | Hewavithana | H04L 25/0244 |
| 2022/0385519 | A1* | 12/2022 | Corbalán Pelegrín | H04L 7/0037 |

OTHER PUBLICATIONS

Yoffe et al., "Tx EVM Requirement for 4k QAM," Mar. 2020, doc.: IEEE 802.11-20/0456r0, 11 pages.

Mohseni, Saeed, "Study the Carrier Frequency Offset (CFO) for Wireless OFDM" (2013). Electronic Theses and Disserations. 438.

P. H. Moose, "A technique for orthogonal frequency division multiplexing frequency offset correction," in IEEE Transactions on Communications, vol. 42, No. 10, pp. 2908-2914, Oct. 1994, doi: 10.1109/26.328961. [Abstract Only].

International Search Report and Written Opinion for PCT Application No. PCT/US2022/074150, dated Dec. 6, 2022.

Chiueh Tzi-Dar et al: "OFDM Baseband Receiver Design for Wireless Communications OFDM Baseband Receiver Design for Wireless Communications Tzi-Dar Chiueh and Pei", OFDM Baseband Receiver Design for Wireless Communications, Jan. 1, 2007 (Jan. 1, 2007), XP055748425, SI ISBN: 978-0-470-82234-0, Retrieved from the Internet: URL:http://www.ee.iitm.ac.in/-giri/pdfs/EE <http://www.ee.iitm.ac.in/-giri/pdfs/EE> 6323-2020/bookl-tsai.pdf [retrieved on Nov. 9, 2020], p. 102-p. 104.

* cited by examiner

RE-ESTIMATING CLOCK OFFSET FOR FREQUENCY-SELECTIVE WIRELESS CHANNELS

TECHNICAL FIELD

Embodiments presented in this disclosure generally relate to wireless network devices, and more specifically, to techniques for re-estimating clock offset for frequency-selective wireless channels.

BACKGROUND

Wireless network devices continue to proliferate in many forms, such as personal computers, smartphones, televisions, tablets, sensors, and so forth. Bandwidth requirements to support the wireless network devices are also steadily increasing. Emerging video formats such as 4K and 8K may require up to a 20 Gbps uncompressed data rate. Emerging applications may also require very high throughput and/or low latency (e.g., virtual reality, augmented reality, gaming, telecommuting, online video conference, cloud computing).

To address the very high throughput and low latency requirements, the IEEE 802.11 standard has introduced a new amendment IEEE 802.11be (also referred to as "Wi-Fi 7" or "Extremely High Throughput" (EHT)). Wi-Fi 7 introduces new physical layer (PHY) and media access control (MAC) modes that support a maximum throughput of 30 Gbps or more. For example, Wi-Fi 7 doubles the bandwidth and the number of service sets (SS) in multi-user, multiple input, multiple output (MU-MIMO), which increases the nominal throughput by four (4). The PHY also introduces higher-rate modulation coding schemes (MCS) such as 4096-quadrature amplitude modulation (QAM), which adds 20% to the nominal throughput.

The signal-to-noise ratio (SNR) needed at the receiver side to accept 4096-QAM is about 40 dB (or equivalently, an error vector magnitude (EVM) of less than −40 dB), which is too great for a typical Wi-Fi scenario. For larger bandwidths and modulation sizes, it becomes more important to accurately estimate and correct RF impairments in the channel. A small error in clock offset estimation can limit the minimum achievable EVM to more than −40 dB even in cases where a client device's SNR is greater than 40 dB.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method comprises receiving a network packet, and estimating, using a preamble of the network packet, a power distribution corresponding to a plurality of subcarriers of a channel. The method further comprises estimating a carrier frequency offset using the power distribution, and estimating a clock offset using the carrier frequency offset.

Another embodiment is a network device comprising one or more computer processors configured to receive a network packet, and estimate, using a preamble of the network packet, a power distribution corresponding to a plurality of subcarriers of a channel. The one or more computer processors are further configured to estimate a carrier frequency offset using the power distribution, and estimate a clock offset using the carrier frequency offset.

Another embodiment is a computer program product comprising a computer-readable storage medium having computer-readable program code embodied therewith. The computer-readable program code is executable by one or more computer processors to perform an operation comprising receiving a network packet, and estimating, using a preamble of the network packet, a power distribution corresponding to a plurality of subcarriers of a channel. The operation further comprises estimating a carrier frequency offset using the power distribution, and estimating a clock offset using the carrier frequency offset.

Example Embodiments

According to the Wi-Fi standard, a single reference oscillator provides the mixer frequency and the DAC/ADC sampling clock for all antennas and frequency segments. The tolerance for the symbol clock frequency and the transmit center frequency is controlled to be within ±20 parts per million (ppm) for the 5 GHz and 6 GHz bands, and within ±25 ppm in the 2.4 GHz band. This locked clock provides the coherent effect on the sampling frequency offset (SFO) and on the carrier frequency offset (CFO), which simplifies the receiver clock offset estimation and correction. By estimating the CFO using the preamble of network packets, the clock offset ppm value may be calculated and used to compensate the CFO and SFO. In highly frequency-selective channels, estimating the CFO can be biased relative to the power of each subcarrier in the channel. The biasing is generally caused by the energy concentration of the received packet in the frequency domain.

According to embodiments described herein, a method comprises receiving a network packet, and estimating, using a preamble of the network packet, a power distribution corresponding to a plurality of subcarriers of a channel. The method further comprises estimating a carrier frequency offset using the power distribution, and estimating a clock offset using the carrier frequency offset.

Figure 1:
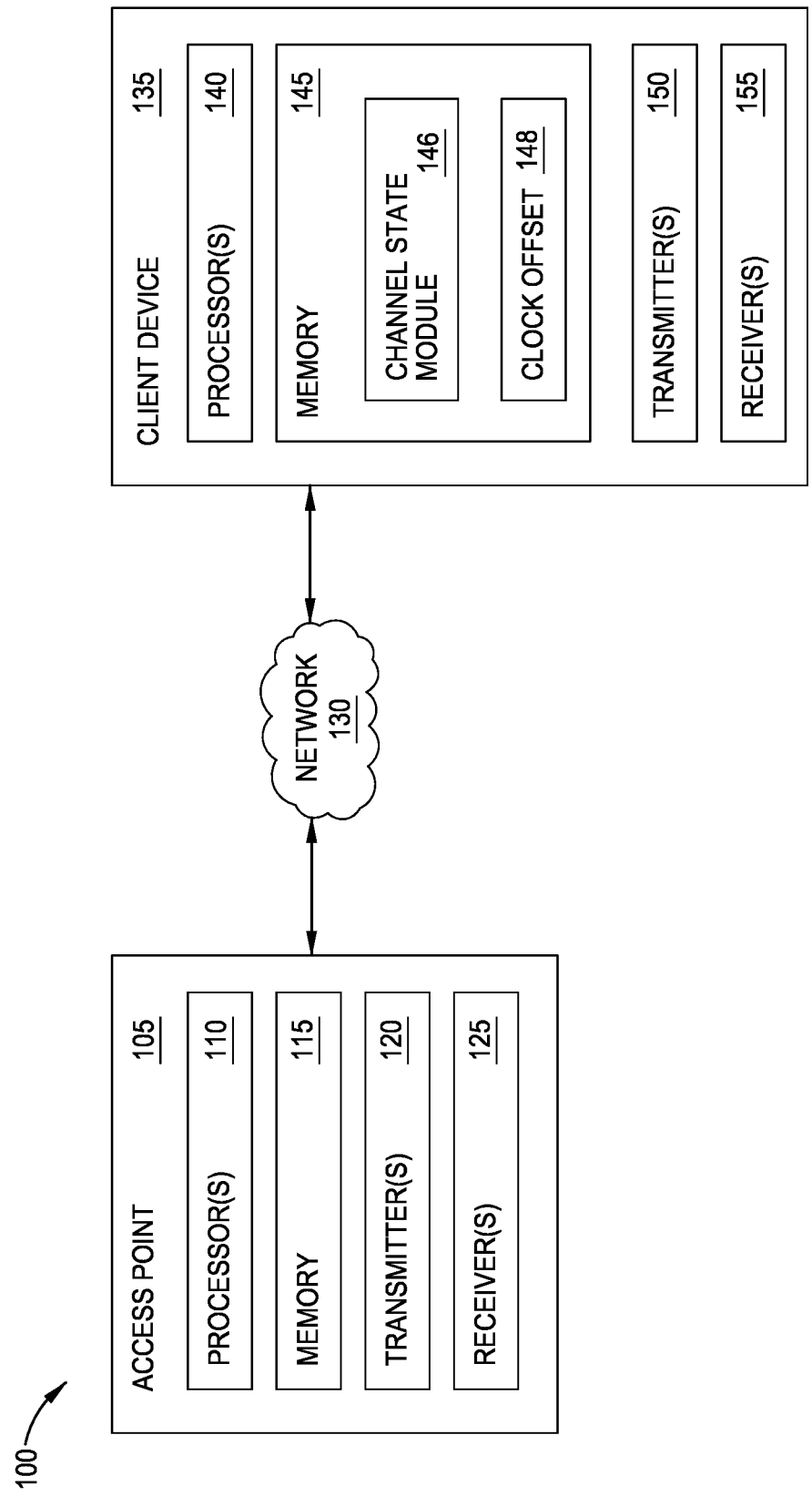
FIG. 1 illustrates an exemplary system including an access point (AP) and a client device, according to one or more embodiments.

FIG. 1 illustrates an exemplary system 100 including an access point (AP) 105 and a client device 135. Although discussed primarily using the terminology of the IEEE 802.11 standard, the techniques described herein are applicable to estimating clock offset using other suitable protocols.

The AP 105 comprises one or more processors 110 and a memory 115. The one or more processors 110 may be implemented in any suitable form, such as a general purpose microprocessor, a controller, an application-specific integrated circuit (ASIC), and so forth. The memory 115 may include a variety of computer-readable media selected for their size, relative performance, or other capabilities: volatile and/or non-volatile media, removable and/or non-removable media, etc. The AP 105 further comprises one or more transmitters 120 and one or more receivers 125. In some embodiments, the one or more transmitters 120 and the one or more receivers 125 support MU-MIMO connections with a number of different client devices.

The client device 135 is communicatively coupled with the AP 105 via a wireless network 130, such as a local area network (LAN), a wide area network (WAN), or a public (e.g., the Internet). In some embodiments, the wireless network 130 is compliant with the IEEE 802.11 standard, although other packet-based protocols are also contemplated. In some embodiments, the wireless network 130 is compliant with IEEE 802.11be (also referred to as "Wi-Fi 7") or subsequent amendments.

The client device 135 may be implemented in any suitable form, such as a smartphone, a tablet computer, a laptop computer, a wearable computer, and so forth. The client device 135 comprises one or more processors 140 and a memory 145. The one or more processors 140 may be configured similarly to the one or more processors 110, and the memory 145 may be configured similarly to the memory 115. The client device 135 further comprises one or more transmitters 150 and one or more receivers 155. In some embodiments, the one or more transmitters 150 and the one or more receivers 155 support MIMO connections with the AP 105.

The memory 115, 145 may include one or more modules for performing various functions described herein. In one embodiment, each module includes program code that is executable by the one or more processors 110, 140. However, other embodiments of the system 100 may include modules that are partially or fully implemented in other hardware (i.e., circuitry) or firmware of the AP 105 and/or the client device 135.

As shown, the memory 145 comprises a channel state module 146 that processes network packets and estimates characteristics of a channel using a preamble of a network packet. In some embodiments, the preamble comprises a plurality of orthogonal frequency-division multiplexing (OFDM) symbols corresponding to a plurality of subcarriers. In some embodiments, the channel state module 146 estimates the channel using a long training field (LTF) from a legacy part or a non-legacy part of the preamble.

Figure 2:
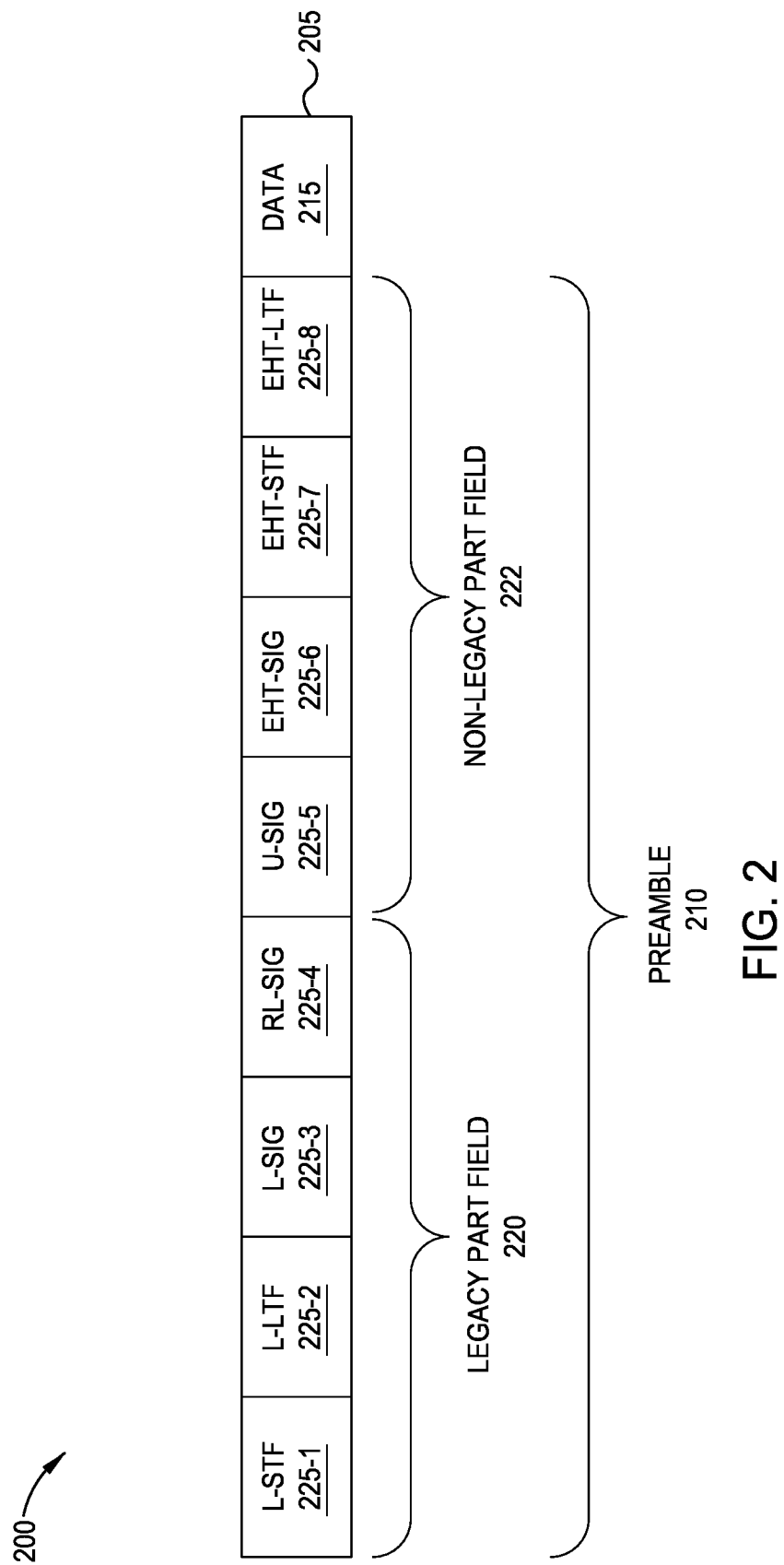
FIG. 2 illustrates formatting of an EHT network packet, according to one or more embodiments.

Refer now to FIG. 2, in which a diagram 200 illustrates the formatting of an EHT network packet 205 (or network packet 205). The network packet 205 comprises a preamble 210 that is followed by a data field 215. The preamble 210 comprises a legacy part field 220 followed by a non-legacy part field 222. The legacy part field 220 comprises a legacy Short Training field (L-STF) 225-1, a legacy LTF (L-LTF) 225-2, a legacy signal field (L-SIG) 225-3, and a repeat legacy signal field (RL-SIG) 225-4. The non-legacy part field 222 comprises a universal signal (U-SIG) field 225-5, an EHT-SIG field 225-6, an EHT Short Training field (EHT-STF) 225-7, and an EHT Long Training field (EHT-LTF) 225-8.

The legacy part field 220 is generally used for frame detection, synchronization, and carrying indicators such as MCSs and frame length. The legacy part field 220 may be arranged at the beginning of the network packet 205 to maintain backward compatibility with legacy client devices operating in various frequency bands (e.g., 2.4 GHz, 5 GHz, 6 GHz).

In some embodiments, the U-SIG field 225-5 includes multiple OFDM symbols that include information for interpretation of the network packet 205. The U-SIG field 225-5 may include version independent fields and/or version dependent fields. Some non-limiting examples of version independent fields include PHY version identifier, UL/DL flag, BSS color, PPDU type, MCS, bandwidth, transmission opportunity (TXOP), and so forth. Some non-limiting examples of version dependent fields include guard interval duration, EHT-STF/LTF size, space-time block coding flag, and so forth. The U-SIG field 225-5 may be configured to indicate additional functionality, such as multi-link aggregation, multi-AP coordination, and so forth.

The EHT-SIG field 225-6 may have a variable length and may include common fields and/or user-specific fields. The common fields may typically include information about RU allocation, coding, MCS, a number of space-time streams, a guard interval duration, and so forth. The EHT-STF field 225-7 and the EHT-LTF field 225-8 include information that allows users to estimate the characteristics of the channel.

Returning to FIG. 1, the channel state module 146 estimates a clock offset 148 for applying to the one or more receivers 155. In some embodiments, the channel state module 146 estimates a carrier frequency offset (CFO) using power information for a plurality of subcarriers of the channel, and estimates the clock offset 148 using the carrier frequency offset.

The clock offset 148 may generally be calculated based on the periodicity of the legacy preambles (e.g., the L-STF 225-1 or the L-LTF 225-2 of FIG. 2) after the beginning of packet detection in a primary channel. The CFO may be represented as:

$$\Delta_{CFO} = \delta \times f_{centerFreq} \quad (1)$$

where $\delta$ represents a normalized clock offset. As discussed above, the normalized clock offset may be controlled to be within ±20 ppm for the 5 GHz and 6 GHz bands, or within ±25 ppm for the 2.4 GHz band.

A coarse or fine estimate of the CFO may be calculated in the time domain (or in the frequency domain) by measuring a phase difference between time samples (or DFT outputs) of successive symbols of the L-STF 225-1 or the L-LTF 225-2 using a maximum likelihood estimator. One example of a time-domain CFO estimation is:

$$\tilde{\Delta}_{CFO} = \angle S / (2\pi N T_s), \quad (2)$$

$$\tilde{\Delta}_{CFO} = \angle \left( \sum_{n=0}^{N-1} y_1^*[n] y_2[n] \right) / (2\pi N T_s), \quad (3)$$

where $y_1[n]$ and $y_2[n]$ represent a repeated OFDM symbol in a same channel, N represents a FFT size, and $T_s$ represents a sampling time. S (the maximum likelihood estimation of CFO) may be further represented as:

$$\sum_{n=0}^{N-1} e^{j2\pi\Delta} \left( \sum_{k=0}^{N-1} |H_k|^2 |s_k|^2 e^{j2\pi k\delta} + \quad (4) \right.$$

$$\sum_{k=0}^{N-1} H_k^* s_k^* e^{-j\frac{2\pi}{N}k(1+\delta)n} \sum_{\substack{k'=0 \\ k' \neq k}}^{N-1} H_{k'} a s_{k'} e^{j\frac{2\pi}{N}k'n} e^{j\frac{2\pi}{N}k'\delta(n+N)} \Bigg)$$

where $H_k$ represents the channel state information for the $k^{th}$ subcarrier.

In highly frequency-selective channels, estimating the CFO can be biased relative to the power of each subcarrier in the channel. The biasing is generally caused by the energy concentration of the received packet in the frequency domain.

Treating those terms of S that include the multiplication of unequal subcarriers as a noise term, the CFO may be represented as:

$$\angle e^{j2\pi\Delta} / (2\pi T_s) + \angle \left( \sum_{k=0}^{N-1} |H_k|^2 |s_k|^2 e^{j2\pi k\delta} + v \right) / (2\pi T_s). \tag{5}$$

Thus, the CFO estimation still depends on the normalized clock offset due to the effects of SFO. When the channel is frequency flat (and assuming that $|S_k|^2=1$), the effects of the SFO term may be considered negligible.

However, when the channel is frequency-selective, the effects of the SFO term may be represented as:

$$\theta_{SFO} = \angle \sum_{k=-\frac{N}{2}}^{\frac{N}{2}} |H_k|^2 e^{j2\pi k\delta} \tag{6}$$

$$= \sum_{k=-\frac{N}{2}}^{\frac{N}{2}} |H_k|^2 (1 + 2\pi k\delta - 2\pi^2 k^2 \delta^2 + \ldots)$$

$$\approx \angle E(|H_k|^2) + \sum_{k=-\frac{N}{2}}^{\frac{N}{2}} j|H_k|^2 2\pi k\delta,$$

$$= \angle E(|H_k|^2) + j2\pi\delta \sum_{k=-\frac{N}{2}}^{\frac{N}{2}} |H_k|^2 k \tag{7}$$

$$= \tan^{-1}\left( \frac{2\pi\delta \sum_{k=-\frac{N}{2}}^{\frac{N}{2}} |H_k|^2 k}{E(|H_k|^2)} \right),$$

which indicates that the phase shift due to SFO is a function of the power of each subcarrier. Thus, the error in the CFO estimation resulting from the impact of channels on the SFO may be represented as:

$$\varepsilon_{CFO} = \frac{\theta_{SFO}}{(2\pi T_s)} = \tan^{-1}\left( \frac{2\pi\delta \sum_{k=-\frac{N}{2}}^{\frac{N}{2}} |H_k|^2 k}{(|H_k|^2)} \right) / (2\pi T_s). \tag{8}$$

In some embodiments, the channel state module 146 calculates an error term according to equation (8) when estimating the CFO.

Figure 3:
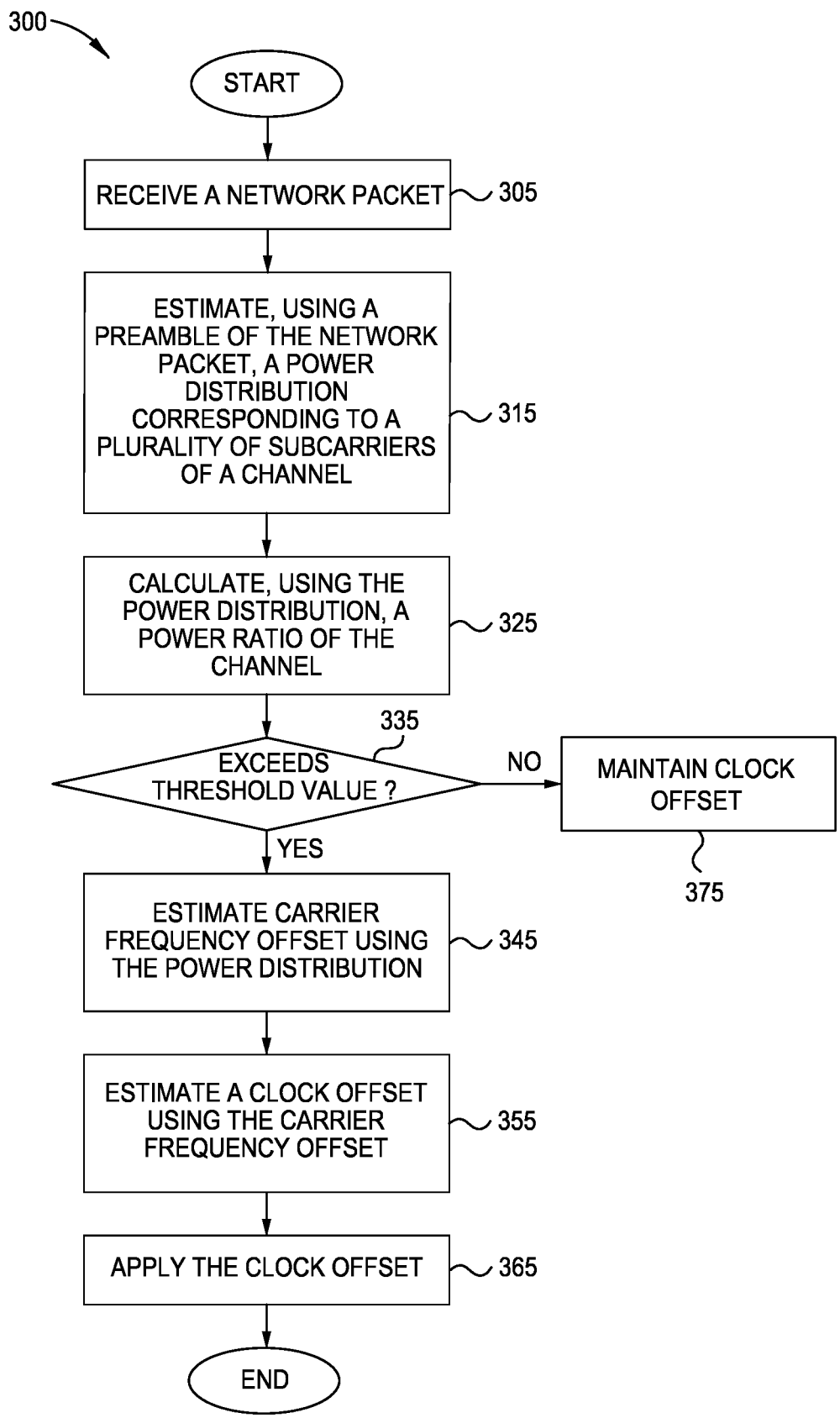
FIG. 3 is a method of determining a clock offset in a frequency-selective wireless channel, according to one or more embodiments.

FIG. 3 is a method 300 of determining a clock offset in a frequency-selective wireless channel. The method 300 may be used in conjunction with other embodiments, such as being performed by the client device 135 (e.g., using the channel state module 146) of FIG. 1.

The method 300 begins at block 305, where a network packet is received by a wireless network device. In some embodiments, the network packet is formatted to be compliant with the IEEE 802.11 standard, such as IEEE 802.11be or subsequent amendments.

At block 315, the wireless network device estimates, using a preamble of the network packet, a power distribution corresponding to a plurality of subcarriers of a channel. In some embodiments, the wireless network device uses one or more LTFs (whether legacy or non-legacy) to estimates the power distribution. For example, the wireless network devices may estimate the power from the channel state information (CSI) using the pre-defined signal and the received signal after performing processing such as removing a cyclic prefix, demapping, and OFDM demodulation.

At block 325, the wireless network device calculates, using the power distribution, a power ratio of the channel. In some embodiments, the power ratio of the channel is calculated as:

$$\frac{\sum_{k=-\frac{N}{2}}^{-1} |H_k|^2}{\sum_{1}^{k=\frac{N}{2}} |H_k|^2}, \tag{9}$$

where N represents an index of the subcarriers (where DC has an index value of zero). Stated another way, the power ratio may be calculated as a sum of the squared amplitudes of each of the subcarriers to one side of the zero index value (DC), divided by a sum of the squared amplitudes of each of the subcarriers to the other side of the zero index value. Other calculations of the power ratio are also contemplated.

In some embodiments, the power ratio represents a criteria for re-estimating the CFO for only those network packets having a sufficiently large power ratio, which can reduce the complexity and latency of the calculations by the wireless network device. At block 335, the power ratio is compared with a threshold value.

When the power ratio does not exceed the threshold value (NO), the method proceeds to block 375 and the clock offset is maintained. When the power ratio exceeds the threshold value (YES), the method proceeds to block 345, where the wireless network device estimates the carrier frequency offset using the power distribution.

At block 355, the wireless network device estimates a clock offset using the carrier frequency offset. At block 365, the wireless network device applies the clock offset. The method 300 ends following completion of block 365 or block 375.

Figure 4:
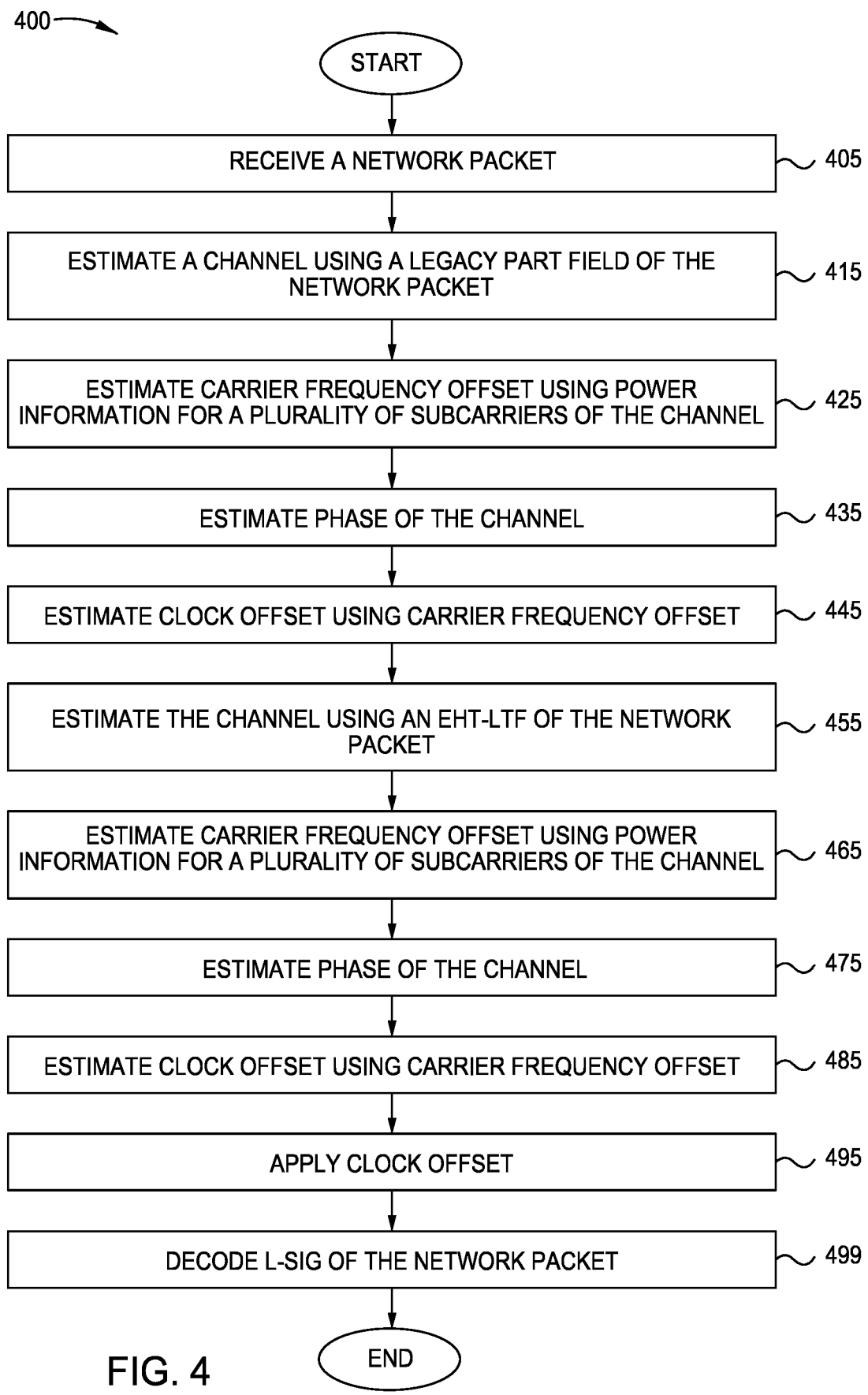
FIG. 4 is a method of estimating a clock offset in a frequency-selective wireless channel of an EHT network, according to one or more embodiments.

FIG. 4 is a method 400 of estimating a clock offset in a frequency-selective wireless channel of an EHT network. The method 400 may be used in conjunction with other embodiments. For example, the method 400 may represent an example of performing the method 300 of FIG. 3 for an EHT-formatted network packet.

The method 400 begins at block 405, where a network packet is received by the wireless network device. At block 415, the wireless network device estimates a channel using a legacy part field of the network packet. In some embodiments, the wireless network device uses a L-LTF to estimate the channel. In other embodiments, the wireless network device uses a L-STF to estimate the channel. At block 425, the wireless network device estimates a carrier frequency offset using power information for a plurality of subcarriers of the channel. In some embodiments, estimating the carrier frequency offset comprises calculating an error term, e.g., according to Equation (8).

At block 435, the wireless network device estimates a phase of the channel. At block 445, the wireless network device estimates a clock offset using the carrier frequency offset. In cases where the channel is not updated based on the dock offset estimated at block 445, the dock offset is not applied until the wireless network device processes the non-legacy part of the network packet. For example; the dock offset may be applied during EHT-STF to minimize the effects of residual CFO in the EVM of the data field. In these cases, no changes are required for subsequent channel estimation based on EHT-LTF. Beneficially, estimating the clock offset at block 445 may have less computational expense, as the legacy field may be decoded without the higher accuracy needed to decode the non-legacy field.

At block 455, the wireless network device estimates the channel using an EHT-LTF of the network packet. In some embodiments, the phase of the channel is updated, e.g., using the block 435. At block 465, the wireless network device estimates a carrier frequency offset using power information for a plurality of subcarriers of the channel. At block 475, the wireless network device estimates a phase of the channel. At block 485, the wireless network device estimates a clock offset using carrier frequency offset. At block 495, the wireless network device applies the clock offset.

At block 499, the wireless network device decodes a L-SIG field of the network packet. In some embodiments, the clock offset of block 445 or the clock offset of block 495 is applied before or during the decoding of the L-SIG field. For these cases, the phase is adjusted is applied for channel estimation. The method 400 ends following the block 499.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   receiving a network packet;
   estimating, using a preamble of the network packet, a power distribution corresponding to a plurality of subcarriers of a channel;
   estimating a carrier frequency offset using the power distribution; and
   estimating a clock offset using the carrier frequency offset.

2. The method of claim 1, wherein the preamble comprises a plurality of orthogonal frequency-division multiplexing (OFDM) symbols corresponding to the plurality of subcarriers.

3. The method of claim 2, wherein the plurality of OFDM symbols are included in a Legacy Short Training Field (L-STF) or a Legacy Long Training Field (L-LTF).

4. The method of claim 2, wherein the plurality of OFDM symbols are included in an Extremely High Throughput Long Training Field (EHT-LTF).

5. The method of claim 1, further comprising:
   calculating, using the power distribution, a power ratio of the channel,
   wherein estimating the carrier frequency offset is based on the power ratio.

6. The method of claim 5, further comprising:
   comparing the power ratio of the channel to a threshold value,
   wherein estimating the carrier frequency offset comprises updating the carrier frequency offset responsive to the power ratio exceeding the threshold value.

7. The method of claim 1, further comprising:
   applying the clock offset before or during decoding a Legacy Signal Field (L-SIG) of the preamble.

8. A network device comprising:
   one or more computer processors configured to:
      receive a network packet;
      estimate, using a preamble of the network packet, a power distribution corresponding to a plurality of subcarriers of a channel;
      estimate a carrier frequency offset using the power distribution; and
      estimate a clock offset using the carrier frequency offset.

9. The network device of claim 8, wherein the preamble comprises a plurality of orthogonal frequency-division multiplexing (OFDM) symbols corresponding to the plurality of subcarriers.

10. The network device of claim 9, wherein the plurality of OFDM symbols are included in a Legacy Short Training Field (L-STF) or a Legacy Long Training Field (L-LTF).

11. The network device of claim 9, wherein the plurality of OFDM symbols are included in an Extremely High Throughput Long Training Field (EHT-LTF).

12. The network device of claim 8, wherein the one or more computer processors are further configured to:
   calculate, using the power distribution, a power ratio of the channel, wherein estimating the carrier frequency offset is based on the power ratio.

13. The network device of claim 12, wherein the one or more computer processors are further configured to:
   compare the power ratio of the channel to a threshold value,
   wherein estimating the carrier frequency offset comprises updating the carrier frequency offset responsive to the power ratio exceeding the threshold value.

14. The network device of claim 8, wherein the one or more computer processors are further configured to:
   apply the clock offset before or during decoding a Legacy Signal Field (L-SIG) of the preamble.

15. A computer program product comprising:
   a non-transitory computer-readable storage medium having computer-readable program code embodied therewith, the non-transitory computer-readable program code executable by one or more computer processors to perform an operation comprising:
      receiving a network packet;
      estimating, using a preamble of the network packet, a power distribution corresponding to a plurality of subcarriers of a channel;
      estimating a carrier frequency offset using the power distribution; and
      estimating a clock offset using the carrier frequency offset.

16. The computer program product of claim 15, wherein the preamble comprises a plurality of orthogonal frequency-division multiplexing (OFDM) symbols corresponding to the plurality of subcarriers.

17. The computer program product of claim 16, wherein the plurality of OFDM symbols are included in a Legacy Short Training Field (L-STF) or a Legacy Long Training Field (L-LTF).

18. The computer program product of claim 16, wherein the plurality of OFDM symbols are included in an Extremely High Throughput Long Training Field (EHT-LTF).

19. The computer program product of claim 15, the operation further comprising:
   calculating, using the power distribution, a power ratio of the channel; and
   comparing the power ratio of the channel to a threshold value,
   wherein estimating the carrier frequency offset comprises updating the carrier frequency offset responsive to the power ratio exceeding the threshold value.

20. The computer program product of claim 15, the operation further comprising:
   applying the clock offset before or during decoding a Legacy Signal Field (L-SIG) of the preamble.

* * * * *

UNITED STATES PATENT AND TRADEMARK OFFICE
CERTIFICATE OF CORRECTION

PATENT NO. : 11,722,981 B2
APPLICATION NO. : 17/444008
DATED : August 8, 2023
INVENTOR(S) : Brian D. Hart et al.

It is certified that error appears in the above-identified patent and that said Letters Patent is hereby corrected as shown below:

In the Specification

In Column 4, Line 39, delete "$\Delta_{CFO}=\delta \times f_{centerFreq}$" and insert -- $\Delta_{CFO}=\delta \times f_{centerFreq}$, --.

In Column 5, Lines 35-38, delete $$= \sum_{k=-\frac{N}{2}}^{\frac{N}{2}} |H_k|^2 (1 + 2\pi k \delta - 2\pi^2 k^2 \delta^2 + \ldots)$$

and insert --

$$= \sum_{k=-\frac{N}{2}}^{\frac{N}{2}} |H_k|^2 (1 + j2\pi k \delta - j2\pi^2 k^2 \delta^2 + \ldots)$$

--.

Signed and Sealed this
Thirteenth Day of August, 2024

Katherine Kelly Vidal
*Director of the United States Patent and Trademark Office*

CERTIFICATE OF CORRECTION (continued)
U.S. Pat. No. 11,722,981 B2

In Column 5, Lines 57-64, delete

"$$\varepsilon_{CFO} = \frac{\theta_{SFO}}{(2\pi T_s)} = \tan^{-1}\left(\frac{2\pi\delta \sum_{k=-\frac{N}{2}}^{\frac{N}{2}} |H_k|^2 k}{(|H_k|^2)}\right) \bigg/ (2\pi T_s). \quad (8)$$"

and insert $$\varepsilon_{CFO} = \frac{\theta_{SFO}}{(2\pi T_s)} = \tan^{-1}\left(\frac{2\pi\delta \sum_{k=-\frac{N}{2}}^{\frac{N}{2}} |H_k|^2 k}{E(|H_k|^2)}\right) \bigg/ (2\pi T_s) \quad (8).$$

In Column 7, Line 11, delete "dock" and insert -- clock --.

In Column 7, Line 11, delete "dock" and insert -- clock --.

In Column 7, Line 13, delete "example;" and insert -- example, --.

In Column 7, Line 14, delete "dock" and insert -- clock --.